(12) United States Patent
Milpied et al.

(10) Patent No.: US 11,112,335 B2
(45) Date of Patent: Sep. 7, 2021

(54) FLUID QUALITY SENSOR FOR MEASURING THE QUALITY OF A FLUID, SENSOR ASSEMBLY AND ASSEMBLY FOR COMBUSTION ENGINES COMPRISING A FLUID QUALITY SENSOR

(71) Applicants: MEAS France, Toulouse (FR); TE Connectivity Norge AS, Blomsterdalen (NO); Measurement Specialties, Inc., Hampton, VA (US)

(72) Inventors: Jean Milpied, Toulouse (FR); Paul Wafo, Toulouse (FR); Armand Castandet, Toulouse (FR); Marius Norvoll Sletten, Fyllingsdalen (NO); Michael Pedrick, Williamsburg, VA (US)

(73) Assignee: MEAS France, Toulouse (FR)

( * ) Notice: Subject to any disclaimer, the term of this patent is extended or adjusted under 35 U.S.C. 154(b) by 161 days.

(21) Appl. No.: 16/008,690

(22) Filed: Jun. 14, 2018

(65) Prior Publication Data

US 2018/0364133 A1 Dec. 20, 2018

(30) Foreign Application Priority Data

Jun. 14, 2017 (EP) .................................. 17305723

(51) Int. Cl.
*G01M 15/04* (2006.01)
*G01M 15/10* (2006.01)
*F01N 3/20* (2006.01)
*F01N 13/00* (2010.01)

(52) U.S. Cl.
CPC ........... *G01M 15/108* (2013.01); *F01N 3/208* (2013.01); *F01N 3/2066* (2013.01); *F01N 13/008* (2013.01); *G01M 15/106* (2013.01); *F01N 2560/06* (2013.01); *F01N 2560/08* (2013.01); *F01N 2560/12* (2013.01); *F01N 2610/02* (2013.01); *F01N 2610/148* (2013.01); *F01N 2610/1433* (2013.01)

(58) Field of Classification Search
CPC .... G01M 15/02; G01M 15/04; G01M 15/042; G01M 15/10
See application file for complete search history.

(56) References Cited

U.S. PATENT DOCUMENTS

| 5,039,279 | A  | * | 8/1991 | Natwick | ........... | A61M 5/14228 |
| | | | | | | 417/474 |
| 8,342,811 | B2 | * | 1/2013 | Berwanger | ............. | F04B 49/06 |
| | | | | | | 417/44.11 |
| 9,089,799 | B2 | | 7/2015 | Crary | | |

(Continued)

FOREIGN PATENT DOCUMENTS

CN 102926844 A 2/2013
CN 105849540 A 8/2016

(Continued)

OTHER PUBLICATIONS

European Search Report, dated Nov. 24, 2017, 7 pages, Parent Application 17305723.3.

*Primary Examiner* — Eric S. McCall

(57) ABSTRACT

A fluid quality sensor for measuring a quality of a fluid comprises a measurement section mounted to an output side of a pump for the fluid.

16 Claims, 4 Drawing Sheets

(56) References Cited

U.S. PATENT DOCUMENTS

| | | | | |
|---|---|---|---|---|
| 2001/0039398 | A1* | 11/2001 | Fowler | A61M 3/0258 |
| | | | | 604/151 |
| 2003/0047008 | A1* | 3/2003 | Gopalakrishnan | G01F 1/05 |
| | | | | 73/861.79 |
| 2007/0139211 | A1* | 6/2007 | Pessin | F04B 47/00 |
| | | | | 340/679 |
| 2011/0293450 | A1* | 12/2011 | Grimes | F04B 17/03 |
| | | | | 417/420 |
| 2013/0019673 | A1* | 1/2013 | Sroka | E21B 49/08 |
| | | | | 73/152.55 |
| 2015/0073338 | A1* | 3/2015 | Waldhoff | A61J 15/0088 |
| | | | | 604/66 |
| 2016/0153443 | A1* | 6/2016 | Glass | F04B 53/10 |
| | | | | 417/53 |
| 2017/0107879 | A1* | 4/2017 | Nocereto | F01N 11/00 |
| 2019/0271307 | A1* | 9/2019 | Kamimura | G01L 19/147 |
| 2020/0222606 | A1* | 7/2020 | Kallenbach | A61M 1/1029 |

FOREIGN PATENT DOCUMENTS

| | | |
|---|---|---|
| EP | 2743471 A1 | 6/2014 |
| WO | 2014118248 A1 | 8/2014 |
| WO | 2015018737 A1 | 2/2015 |

* cited by examiner ical application No.
17305723.3, filed on Jun. 14, 2017.

FLUID QUALITY SENSOR FOR MEASURING THE QUALITY OF A FLUID, SENSOR ASSEMBLY AND ASSEMBLY FOR COMBUSTION ENGINES COMPRISING A FLUID QUALITY SENSOR

CROSS-REFERENCE TO RELATED APPLICATION

This application claims the benefit of the filing date under 35 U.S.C. § 119(a)-(d) of European Patent Application No. 17305723.3, filed on Jun. 14, 2017.

FIELD OF THE INVENTION

The present invention relates to a fluid quality sensor and, more particularly, to a fluid quality sensor used to measure a quality of an exhaust fluid for a combustion engine.

BACKGROUND

A fluid quality sensor is commonly used to monitor a quality of an exhaust fluid, for example, a diesel exhaust fluid of a vehicle such as a car or a truck. In an embodiment, the fluid of which the quality is measured is a diesel exhaust fluid (DEF) injected into the exhaust system of diesel combustion engines in order to reduce the amount of pollutants through selective catalytic reduction (SCR).

Previous systems for supplying the fluid comprise a fluid quality sensor located in a tank. The tank, however, is usually at an exposed position and is subjected to, for example, cold temperatures and freezing. A fluid quality sensor in such a tank therefore cannot measure the quality reliably in all conditions of operation of the SCR system.

SUMMARY

A fluid quality sensor for measuring a quality of a fluid comprises a measurement section mounted to an output side of a pump for the fluid.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
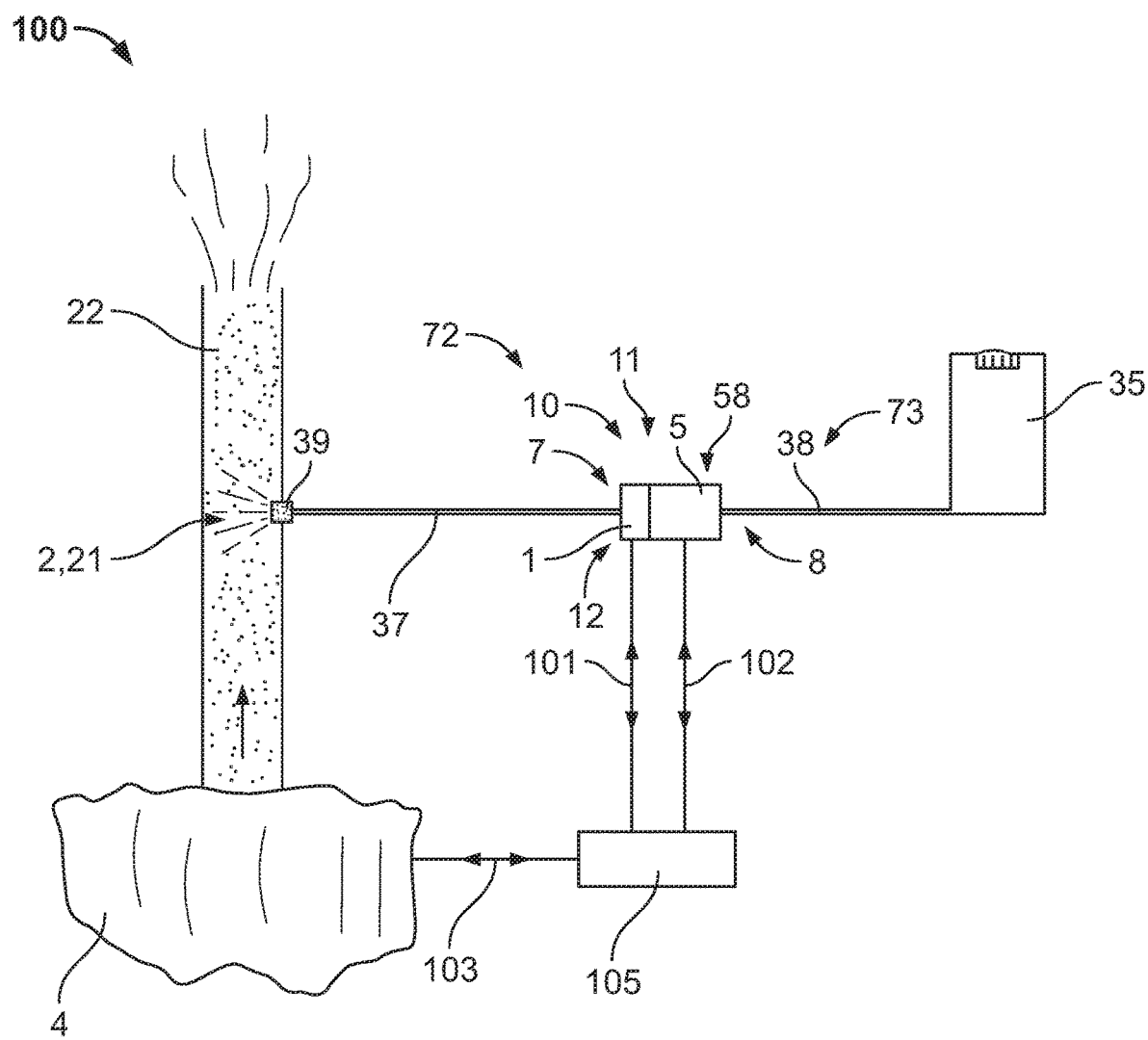
FIG. 1 is a schematic diagram of an assembly including a fluid quality sensor.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A fluid quality sensor 1 is shown as part of an assembly 100 for a combustion engine 4 in FIG. 1. The combustion engine 4 produces exhaust gases that exit through an exhaust system 22. In order to reduce the pollutants in the gas stream, a fluid 2, in particular an exhaust fluid 21, such as aqueous urea solution known as AdBlue, is injected into the exhaust system 22 with a nozzle 39.

The assembly 100, as shown in FIG. 1, comprises a tank 35 for the exhaust fluid 21 to which an input line 38 is attached that can supply the fluid 2 at an input side 8 to a pump 5. The pump 5, which for example can be a pressure pump 58, supplies the fluid 2 via an output line 37 attached at an output side 7 to the nozzle 39.

At the output side 7, as shown in FIG. 1, the fluid quality sensor 1 is attached to the pump 5 to check the quality of the fluid 2. The fluid quality sensor 1 is connected to an electronic control unit (ECU) 105 with a cable 101. Based on the data provided by the fluid quality sensor 1, the ECU 105 can control the engine 4 or the pump 5 which are connected to the ECU 105 by electrical signals transmitted along cables 102, 103. The fluid quality sensor 1 is attached at the output side 7 so that exactly the portion of the fluid 2 that is to be injected into the exhaust system 22 is measured by the fluid quality sensor 1. In previous systems, only the portion of the fluid 2 in the tank 35 was measured, which is not identical to and may have different properties than the portion of the fluid 2 that is to be injected. The fluid quality sensor 1 is also better protected against external influences and is hence more reliable.

In the embodiment shown in FIG. 1, the fluid quality sensor 1 is part of a sensor assembly 10. The sensor assembly 10 includes further sensors like a temperature sensor 11 and a pressure sensor 12 for measuring the pressure and the temperature at the output side 7. These data can also be supplied to the ECU 105 for controlling the engine 4 or the pump 5 depending on the values of the parameters.

Figure 2:
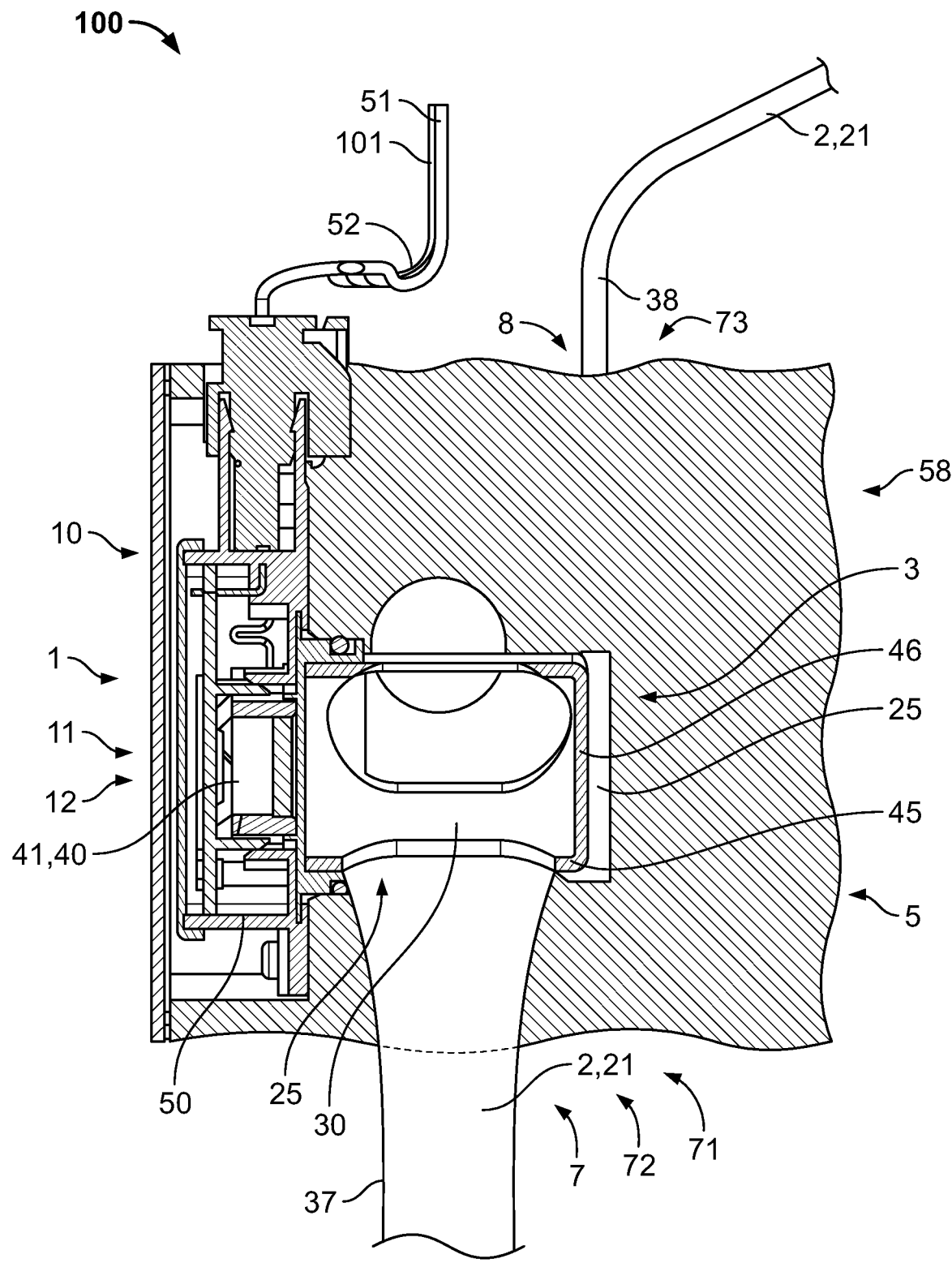
FIG. 2 is a sectional view of the fluid quality sensor attached to a pump.
Figure 3:
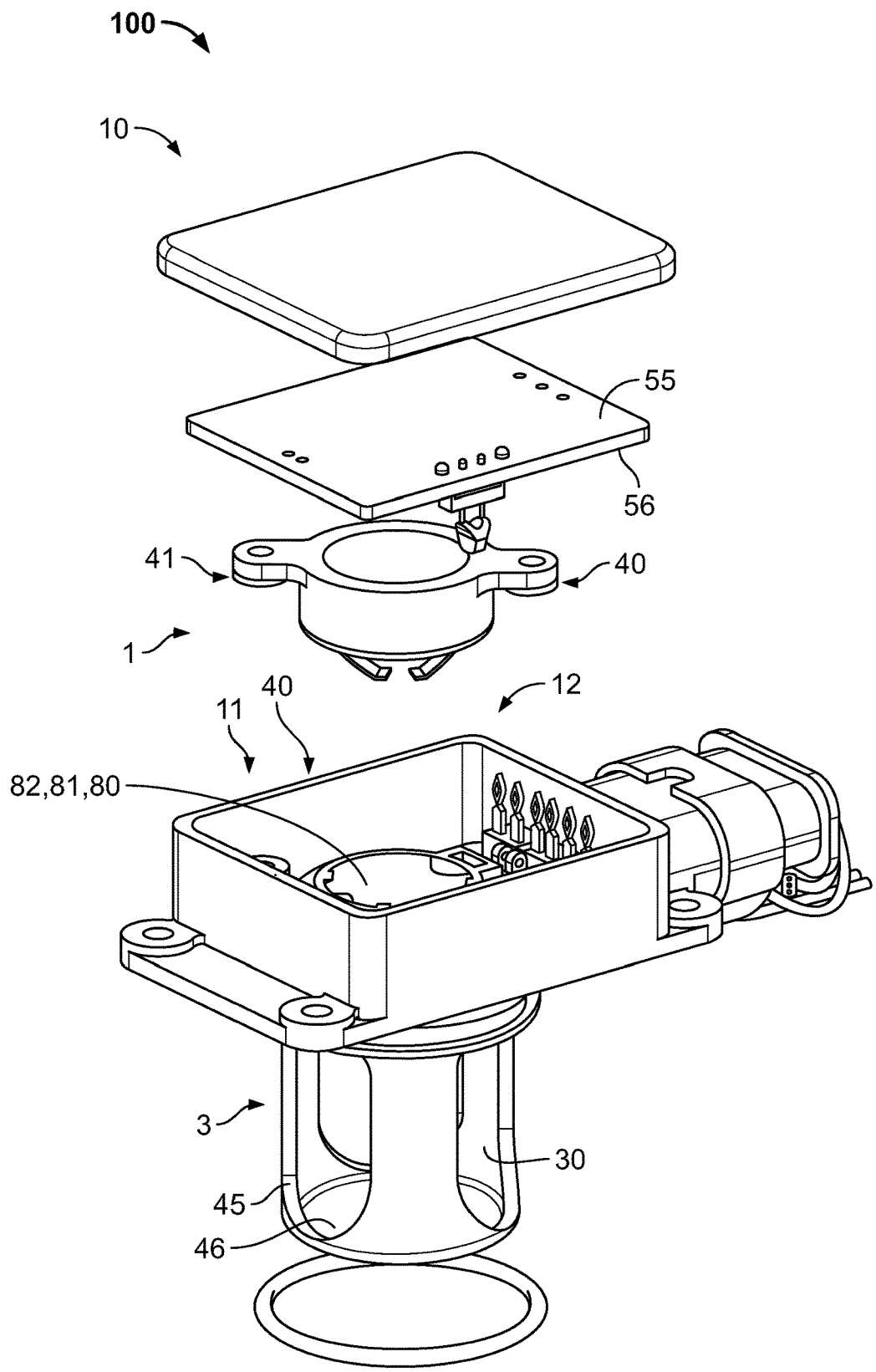
FIG. 3 is an exploded perspective view of the fluid quality sensor.
Figure 4:
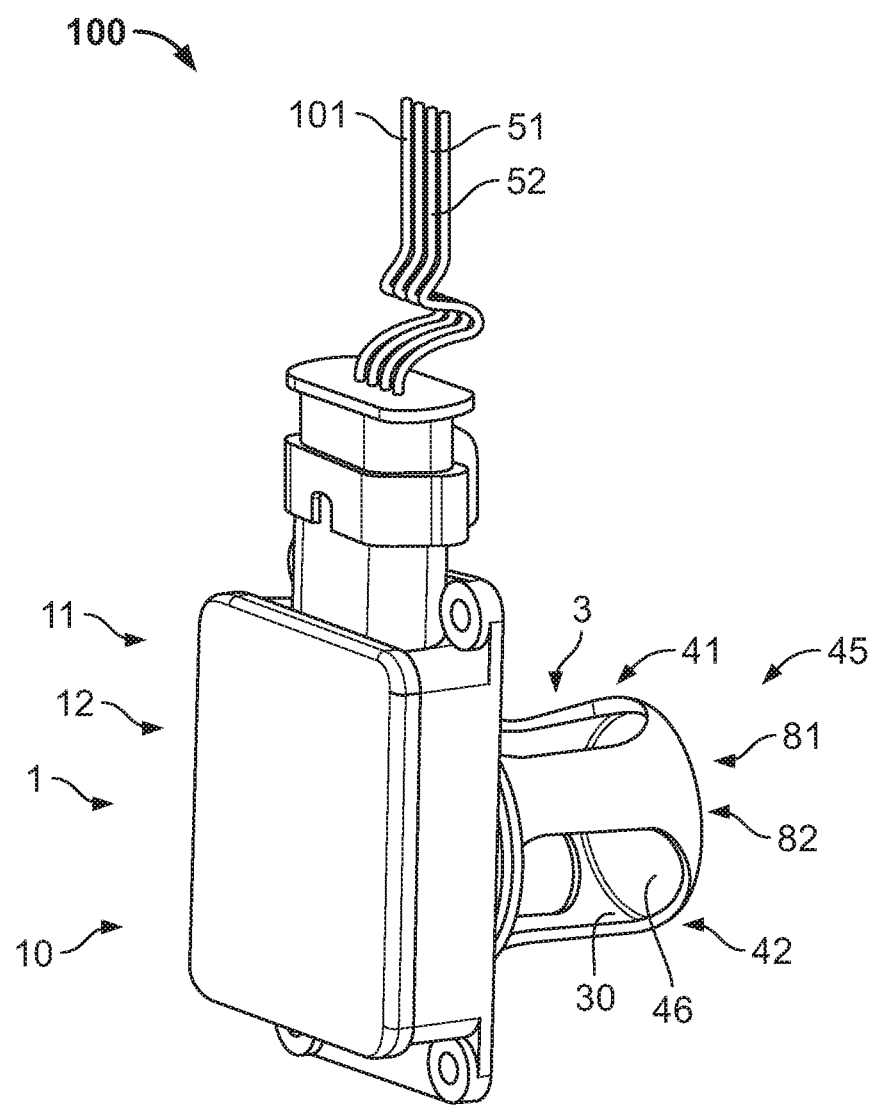
FIG. 4 is a perspective view of the fluid quality sensor.

The fluid quality sensor 1 and the sensor assembly 10 including the fluid quality sensor 1 are shown in greater detail in FIGS. 2-4. The fluid quality sensor 1 is shown attached to the pump 5 in FIG. 2 and the sensor assembly 10 is shown without the pump 5 in FIGS. 3 and 4.

The input side 8 of the pump 5 at which the input line 38 supplying the fluid 2 is attached, as shown in FIG. 2, is a low pressure side 73. The pump 5 is a pressure pump 58. The pump 5, 58 creates a pressure for pumping the fluid 2 from the input side 8 to the output side 7 to which the output line 37 is attached. The pump 5 comprises a fluid cavity 25 at the output side 7. The output side 7 of the pump 5 is a pressure side 71, or a side of the pump 5 that is a high pressure side 72 with a higher pressure than the low pressure side 73.

As shown in FIG. 2, a measurement section 3 of the fluid quality sensor 1 is mounted to the output side 7 of the pump 5. The measurement section 3 is at least partially located in the fluid cavity 25 of the pump 5. The measurement area 30 is thus the volume or area in which the quality of the fluid 2 is measured when it is located in this volume or area. In various embodiments, the measurement area 30 can be lobe-like or have a cylindrical shape. In other embodiments, the measurement area 30 can be spherical or disc-shaped or have other shapes. A measurement area 30, at which the quality of the fluid 2 is measured, is located in the fluid cavity 25 which in this case is a high pressure fluid cavity in which 4.5 to 8.5 bar are present.

In various embodiments, the fluid quality sensor 1 can be configured to be mounted inside the pump 5 at least partially or completely. In other embodiments, the fluid quality sensor 1 can be mounted outside the pump 5 between the pump 5 and the exhaust system 22.

In the embodiment shown in FIGS. 2-4, the fluid quality sensor 1 is an ultrasonic sensor including an ultrasound source 40 and an ultrasound detector 41. The ultrasound source 40 and the ultrasound detector 41 respectively emit and absorb ultrasonic waves for measuring the quality of the fluid 2. In other embodiments, the fluid quality sensor 1 may be an infrared sensor with an infrared source and an infrared detector.

To reflect the ultrasonic or infrared waves, the fluid quality sensor 1 includes a reflector structure 45 with a reflector surface 46 located at an inside of an end of the reflector structure 45. The reflector structure 45, as shown in FIGS. 2-4, is fixed to a housing 50 of the sensor assembly 10. The reflector surface 46 thus has a predefined distance from the ultrasound source 40 and the ultrasound detector 41. The fluid quality sensor 1 can thus be used in several different pumps without the need for an initial gauging measurement. In the shown embodiment, the reflector structure 45 has a cage shape with several openings to allowing sufficient stream of the fluid 2 through the reflector structure 45. The reflector structure 45 can be at least partially located in or protrude into the fluid cavity 25 in order to keep the space requirements at a minimum. In order to save material and space, the reflector structure 45 can also be adapted to form a part of the fluid cavity 25; for example, the reflector structure 45 can form a wall of the fluid cavity 25 making another wall superfluous. In an embodiment, the reflector structure 45 can be located on a part of the pump 5 to form a smaller fluid quality sensor 1.

In the embodiment shown in FIGS. 2-4, the sensor assembly 10 comprises the sensor 12 and the temperature sensor 11 for measuring the pressure and the temperature at the output side 7 and in the fluid cavity 25. The sensor assembly 10 has a common housing 50 for the sensors 1, 11, 12 to achieve a compact design. Further, the sensor assembly 10 is a common output 51 in the common supply 52 for all the sensors 1, 11, 12; the data or signals output by the sensor assembly 10 are all supplied to the ECU 105 with the single cable 101. In order to minimize the number of electric components, the sensors 1, 11, 12 in the sensor assembly 10 can have a common supply such as a common voltage supply or a common power supply.

In an embodiment, the sensor assembly 10, as shown in FIG. 3, further comprises a plurality of first electronics 55 for controlling the sensor assembly 10, in particular the fluid quality sensor 1. The sensor assembly 10 also comprises a plurality of second electronics 56 for analyzing or converting the measurement data by analyzing and/or processing a plurality of signals of the sensors 1, 11, 12.

In an embodiment, the fluid quality sensor 1 also comprises a disc-like transmission element 81 shown in FIGS. 3 and 4 for transmitting the ultrasound waves. The transmission element 80 also serves as a protection element 82 protecting the sensor assembly 10 from the harmful fluid 2 which could otherwise damage parts of the fluid quality sensor 1 and for sealing the fluid cavity 25 of the pump 5.

What is claimed is:

1. A fluid quality sensor for measuring a quality of a fluid, comprising:
   a measurement section mounted to an output side of a pump for the fluid, the measurement section is at least partially located in a fluid cavity of the pump;
   an ultrasound or infrared source emitting an ultrasonic or infrared signal into the measurement section;
   an ultrasound or infrared detector receiving the ultrasonic or infrared signal after passing through the measurement section; and
   a reflector structure for the ultrasonic or infrared signal.

2. The fluid quality sensor of claim 1, wherein the fluid is an exhaust fluid for a combustion engine and includes urea.

3. The fluid quality sensor of claim 1, wherein the fluid quality sensor is mounted inside the pump.

4. The fluid quality sensor of claim 1, wherein the reflector structure forms a part of the fluid cavity.

5. The fluid quality sensor of claim 1, wherein an output line of the pump is attached to the output side and extends away from the fluid cavity.

6. A sensor assembly, comprising:
   a fluid quality sensor for measuring a quality of a fluid, the fluid quality sensor including a measurement section mounted to an output side of a pump for the fluid, the measurement section is at least partially located in a fluid cavity of the pump, the fluid quality sensor including an ultrasound or infrared source emitting an ultrasonic or infrared signal into the measurement section, an ultrasound or infrared detector receiving the ultrasonic or infrared signal after passing through the measurement section, and a reflector structure for the ultrasonic or infrared signal; and
   at least one additional sensor at least partially located in the fluid cavity.

7. The sensor assembly of claim 6, wherein the at least one additional sensor includes a temperature sensor and/or a pressure sensor.

8. The sensor assembly of claim 6, wherein the sensor assembly includes a common housing for the fluid quality sensor and the at least one additional sensor.

9. The sensor assembly of claim 6, wherein the sensor assembly includes a common output for the fluid quality sensor and the at least one additional sensor.

10. The sensor assembly of claim 6, further comprising a plurality of first electronics for controlling the fluid quality sensor and the at least one additional sensor.

11. The sensor assembly of claim 10, further comprising a plurality of second electronics for analyzing and/or processing a plurality of signals of the fluid quality sensor and the at least one additional sensor.

12. An assembly for a combustion engine, comprising:
   a pump;
   a fluid quality sensor for measuring a quality of a fluid, the fluid quality sensor including a measurement section mounted to an output side of the pump, the measurement section is at least partially located in a fluid cavity of the pump, the fluid quality sensor including an ultrasound source emitting an ultrasonic signal into the measurement section and an ultrasound detector receiving the ultrasonic signal after passing through the measurement section; and
   a transmission element between the fluid quality sensor and the fluid cavity, the transmission element transmits an ultrasound wave of the ultrasound source.

13. The assembly of claim 12, wherein the pump is a pressure pump and the fluid quality sensor is attached at a high pressure side of the pump.

14. The assembly of claim 12, wherein the transmission element is a protection element protecting the fluid quality sensor from the fluid.

15. The assembly of claim 12, further comprising at least one additional sensor.

16. The assembly of claim 15, wherein the at least one additional sensor is at least partially located in the fluid cavity of the pump.

* * * * *